US 6,731,300 B2

(12) United States Patent
Ramani et al.

(10) Patent No.: US 6,731,300 B2
(45) Date of Patent: May 4, 2004

(54) EFFICIENT ANTI-ALIASED DOT RASTERIZATION

(75) Inventors: Nandini Ramani, Saratoga, CA (US); Michael A. Wasserman, Redwood City, CA (US); Michael G. Lavelle, Saratoga, CA (US); Mark E. Pascual, San Jose, CA (US); Kevin Tang, Union City, CA (US); Daniel M. Chao, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 151 days.

(21) Appl. No.: 09/861,177

(22) Filed: May 18, 2001

(65) Prior Publication Data

US 2002/0171665 A1 Nov. 21, 2002

(51) Int. Cl.[7] ................................................ G06T 15/00
(52) U.S. Cl. ........................ 345/611; 345/612; 345/613; 345/614; 345/615; 345/606
(58) Field of Search ................ 345/611–616, 606–610, 345/581, 589, 593

(56) References Cited

U.S. PATENT DOCUMENTS

| | | | | |
|---|---|---|---|---|
| 5,432,906 A | * | 7/1995 | Newman et al. ............. 395/162 |
| 6,072,505 A | * | 6/2000 | Piazza et al. ................ 345/501 |
| 6,091,425 A | * | 7/2000 | Law ............................ 345/619 |
| 6,329,977 B1 | * | 12/2001 | McNamara et al. ......... 345/589 |
| 6,400,838 B2 | * | 6/2002 | Watanabe .................... 382/144 |
| 6,418,243 B1 | * | 7/2002 | Skoglund et al. ............ 382/274 |
| 6,424,343 B1 | | 7/2002 | Deering et al. .............. 345/419 |
| 6,509,902 B1 | * | 1/2003 | Pfister et al. ................ 345/582 |
| 6,518,974 B2 | * | 2/2003 | Taylor et al. ................ 345/582 |
| 6,535,220 B2 | * | 3/2003 | Deering et al. .............. 345/582 |
| 6,559,858 B1 | * | 5/2003 | Schneider et al. .......... 345/611 |
| 6,577,312 B2 | * | 6/2003 | Deering et al. .............. 345/428 |

* cited by examiner

*Primary Examiner*—Matthew Luu
*Assistant Examiner*—Daniel J Chung
(74) *Attorney, Agent, or Firm*—Meyertons Hoods Kivlin Kowert & Goetzel, P.C.; Jeffrey C. Hood; Mark K. Brightwell

(57) ABSTRACT

A graphics system may be configured to render anti-aliased dots in terms of samples and to generate pixels by filtering the samples. The pixels are supplied to one or more display devices. The means used to generate the samples may perform the computation of radial distance at positions on a grid in a rendering coordinate space, and interpolate estimates for the radial distances of samples around the dot as needed based on the radii at the grid positions.

24 Claims, 13 Drawing Sheets

Fig. 12 — Candidate Render Bin

EFFICIENT ANTI-ALIASED DOT RASTERIZATION

CROSS-REFERENCE TO RELATED APPLICATIONS

Not Applicable.

BACKGROUND OF THE INVENTION

1. Field of the Invention

This invention relates generally to the field of computer graphics and, more particularly, to high performance graphics systems for rendering graphical objects such as dots on a display screen.

2. Description of the Related Art

A graphics system (e.g. a hardware graphics accelerator) may be configured to receive graphics commands and to generate pixels for display on a display device. The commands may originate from a graphics application running on a host computer system. For example, the graphics application may issue commands to invoke the rendering dots or lines. The graphics system may render a dot in response to a command which specifies the center and radius of a disk which mathematically (i.e. geometrically) defines the dot. The command may also specify a color for the dot.

Experience has shown that the sharp transition of color at the edge of the dot leads to unpleasing visual effects. Thus, it is desirable to perform some sort of smoothing (i.e. anti-aliasing) of color around the edge of the dot disk. For example, it is possible to compute the radial distance R from the center of the dot for each pixel in a circular neighborhood of the dot (and concentric with the dot). Each pixels in a transition region around the dot may be assigned a smoothed color according to the relation $$f(R)DotColor+(1-f(R))*PixelColor,$$

where the function $f(R)$ transitions from one at the dot radius $R_D$ to zero at the some larger outer radius, and where PixelColor is the original intrinsic color of the pixel.

One problem with this approach is that it requires a computation of radial distance R for each pixel (or sample) in the neighborhood of the dot. Thus, there exists need for a system and method which could rending dots without the burdensome root sum of squares computation to determine radial distance for each pixel (or sample) in the neighborhood of a dot.

SUMMARY OF THE INVENTION

In various embodiments of the present invention, a graphics system may be configured to render anti-aliased dots in terms of samples and to generate pixels by filtering the samples. The pixels are supplied to one or more display devices. The means used to generate the samples may perform the computation of radial distance at positions on a grid in the rendering coordinate space. It may then interpolate estimates for the radial distances of samples around the dot as needed based on the radii at the grid positions.

In one set of embodiments, a method for generating a dot on a display device may be arranged as follows. A processing system (e.g. one or more processors configured to execute program instructions, one or more specialized circuits, or any combination of processors and specialized circuitry) may receive a graphics command specifying the center of the dot in a coordinate space, and determine a set of candidate bins which intersect a neighborhood of the dot center. The neighborhood may be large enough to contain the dot and an annular region around the dot. In addition, the processing system may:

(a) compute radial extent values at corners of the candidate bins, where the radial extent values indicate radial extent (e.g. distance or square distance) of the corners with respect to the dot center;

(b) interpolate estimated radial extent values (with respect to the dot center) for sample positions in the candidate render bins based on the corner radial extent values; and (c) compute sample values for samples at the sample positions, where the sample values depend on the estimated radial extent values of the sample positions.

The sample values may be filtered to generate pixels which define a screen image. The pixels may be transmitted to a display device for visual output.

In a second set of embodiments, a graphics system may be configured to generate a dot on a display device as follows. The graphics system may comprise a rendering unit and a pixel computation unit. The rendering unit may be configured to:

(a) receive a graphics command specifying a center for the dot;

(b) compute radial extent values indicating radial extent from the dot center to a plurality of base positions in a neighborhood of the dot center;

(c) interpolate estimated radial extent values at sample positions in the neighborhood using the base radial extent values; and (d) compute sample values for samples corresponding to the sample positions, where the sample values depend on the estimated radial extent values of the sample positions.

The sample values may be stored into a frame buffer. The pixel computation unit may be configured to read the sample values from the sample buffer and to filter the sample values to generate output pixels for transmission to the display device.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
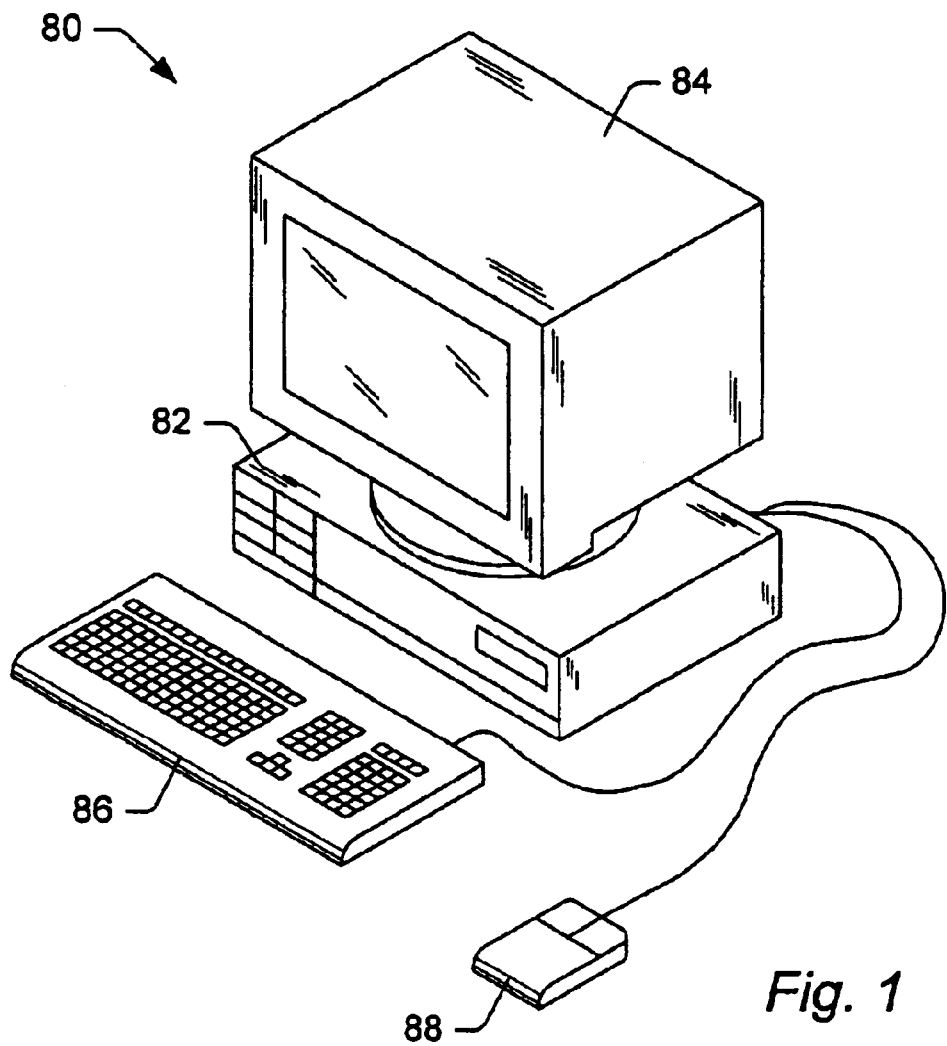
FIG. 1 illustrates one embodiment of a graphics system configured to perform 3D graphics computations for display of graphical object on a display device.

While the invention is susceptible to various modifications and alternative forms, specific embodiments thereof are shown by way of example in the drawings and will be described in detail herein. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word "include", and derivations thereof, are used herein to mean "including, but not limited to."

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
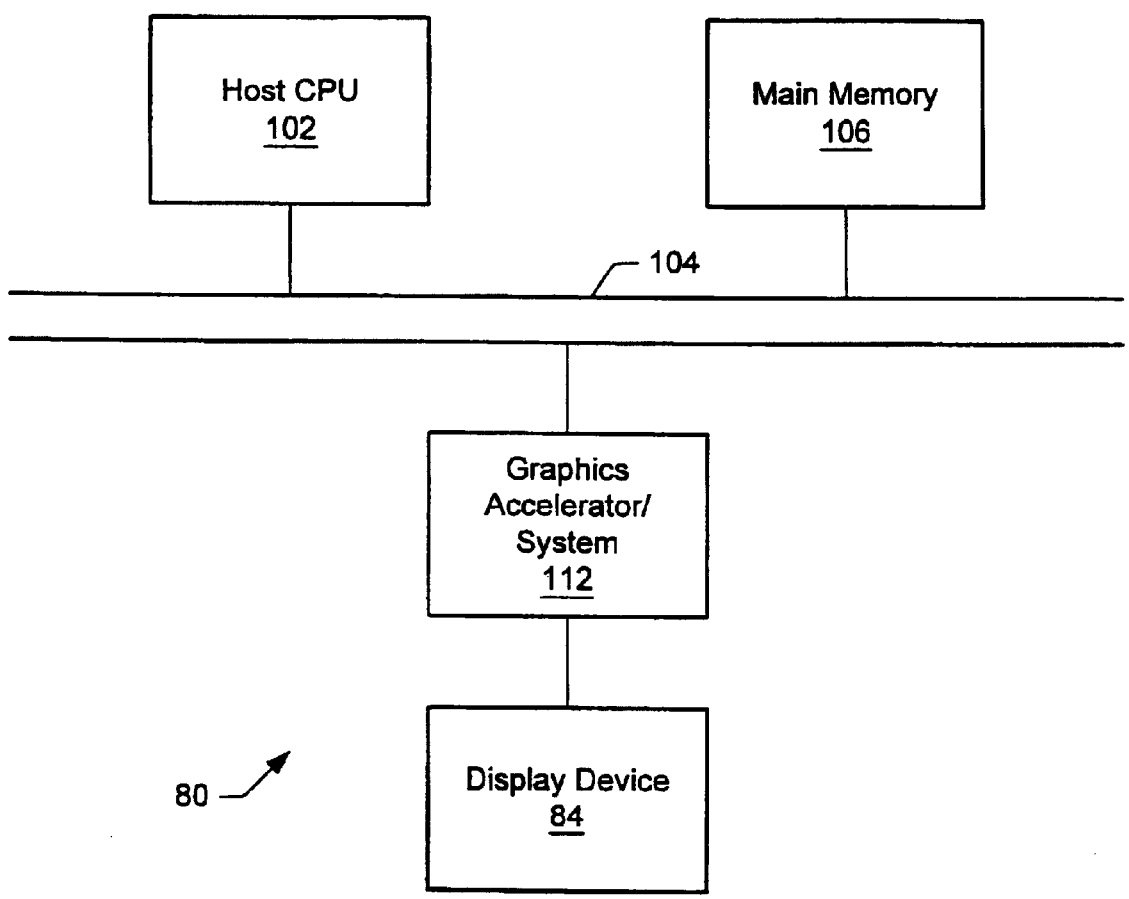
FIG. 2 is a block diagram for one embodiment of computer system 80.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
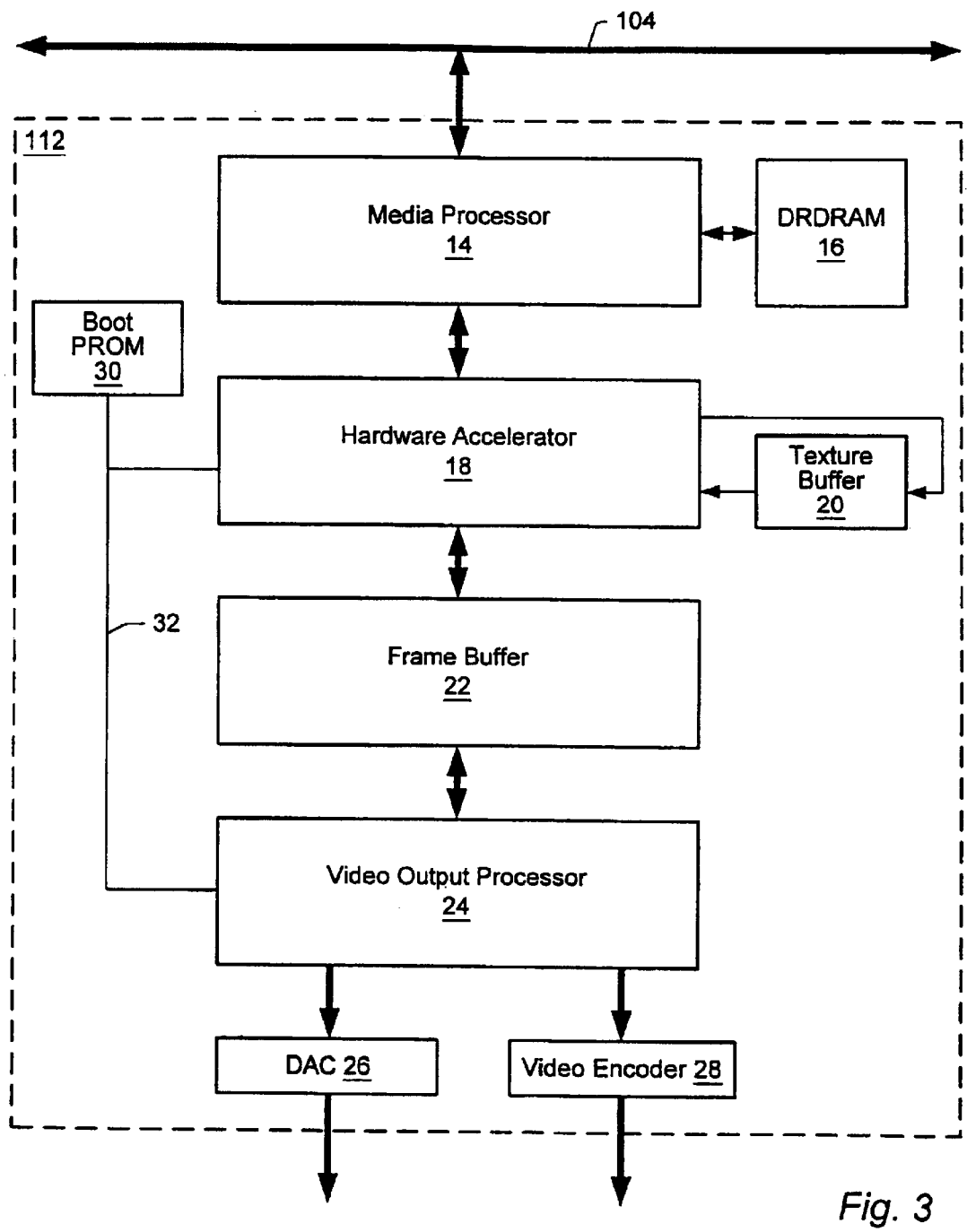
FIG. 3 is a block diagram for one embodiment of a graphics system configured to generate one or more video streams in response to received graphics data.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
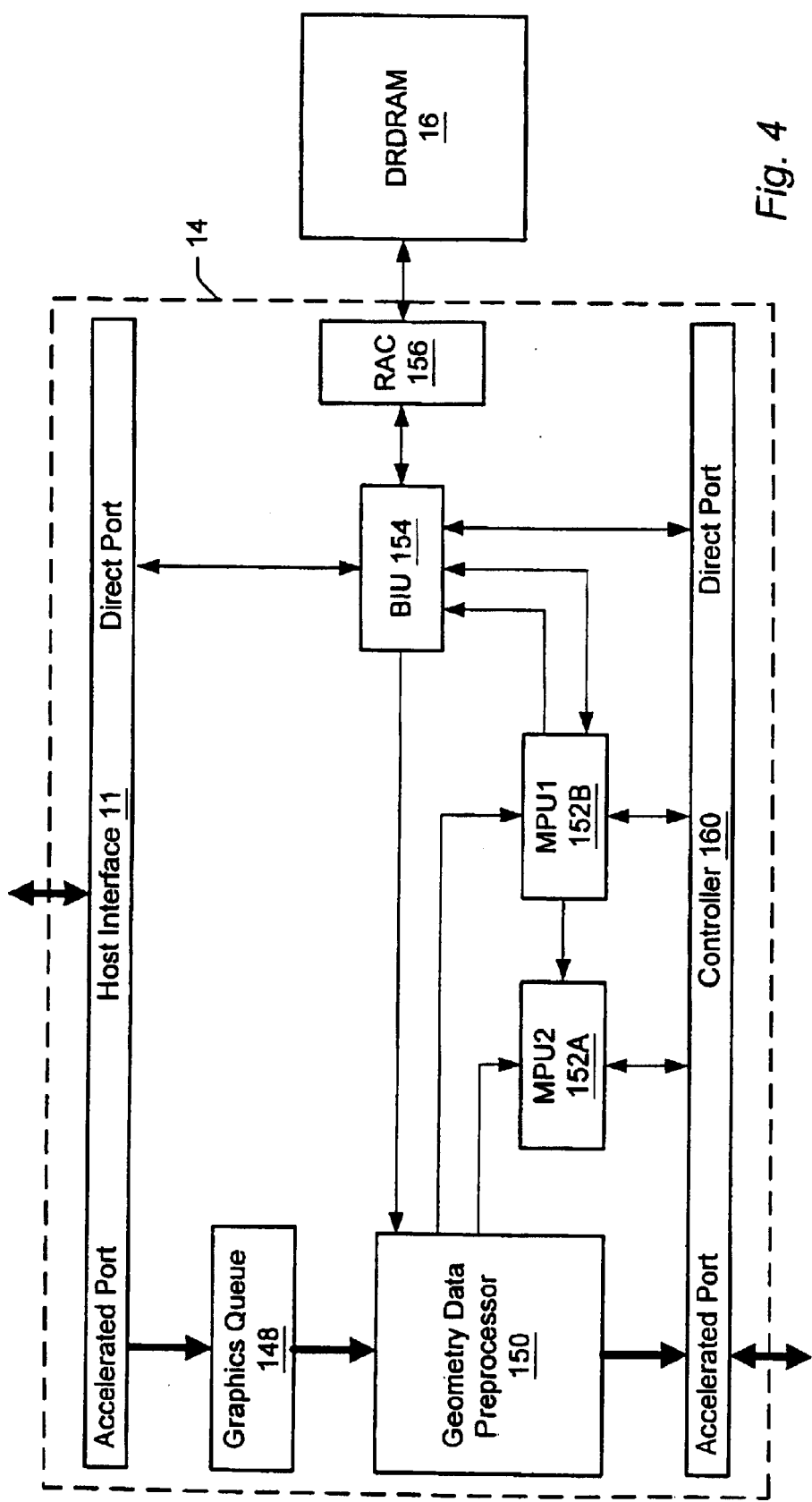
FIG. 4 is a block diagram for one embodiment of media processor 14.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
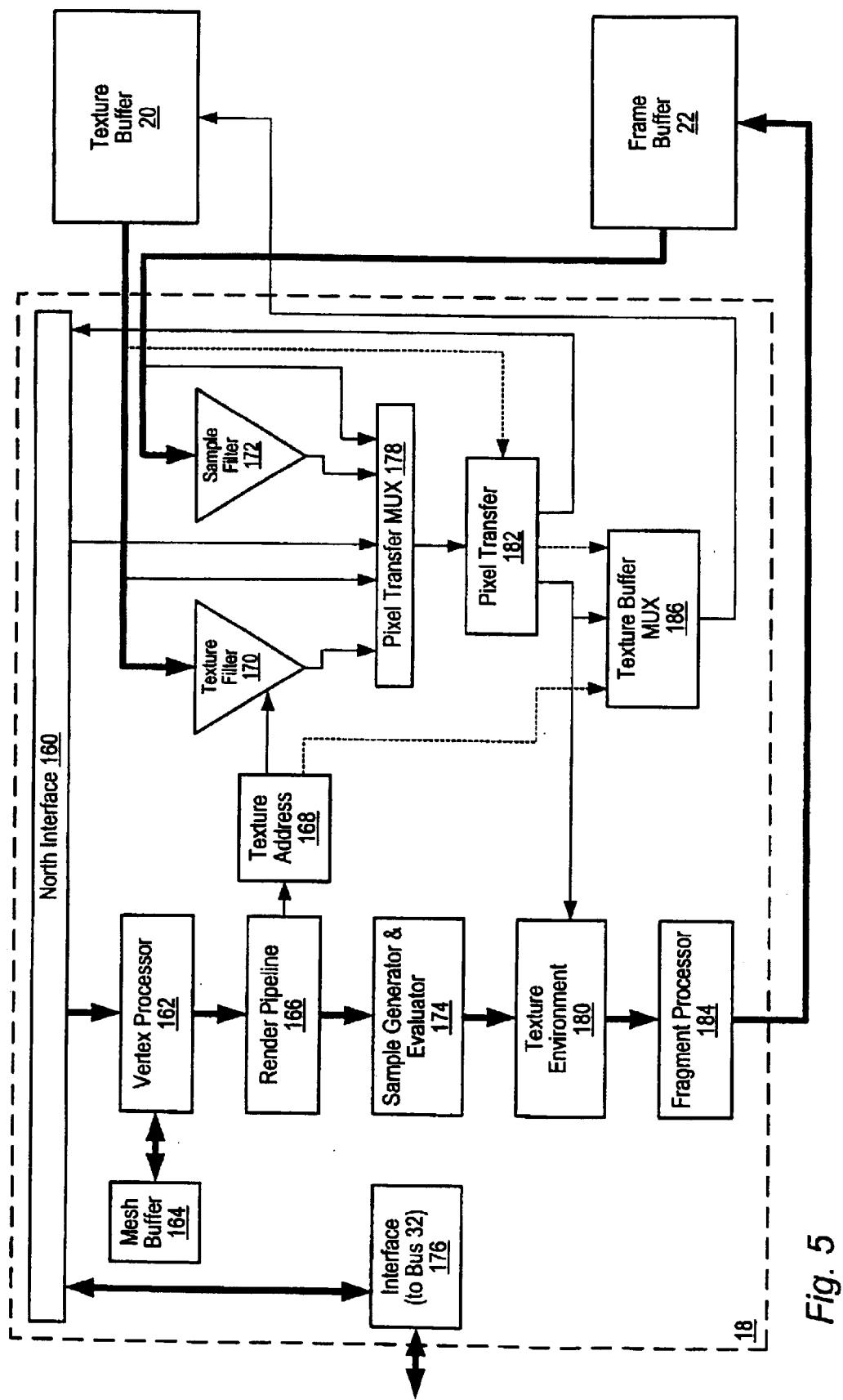
FIG. 5 is a block diagram for one embodiment of hardware accelerator 18.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Figure 6:
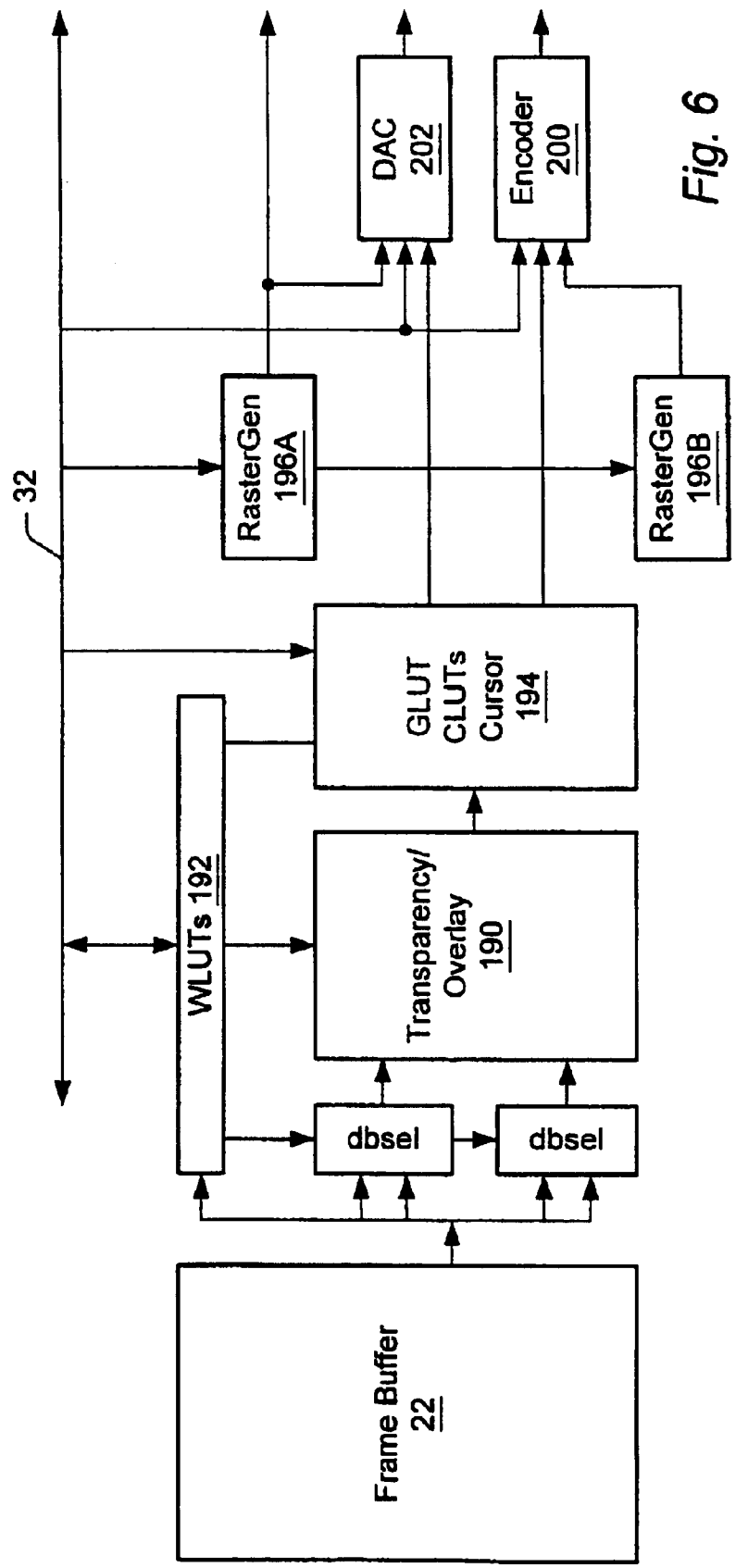
FIG. 6 is a block diagram for one embodiment of video output processor 24.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Dot Rasterization

Hardware accelerator 18 may be configured to perform a number of rendering operations including the rasterization of dots. A dot may be defined by a dot center position ($X_{center}$, $Y_{center}$), a dot diameter $D_{dot}$, and a color vector ($r_{dot}$, $g_{dot}$, $b_{dot}$). In addition, the dot may have other attribute values such as alpha, z, secondary color (e.g. specular color) and/or texture values. Hardware accelerator 18 may receive the dot center position, dot diameter and dot color (and perhaps other attributes) for a dot to be rendered from media processor 14.

Figure 7:
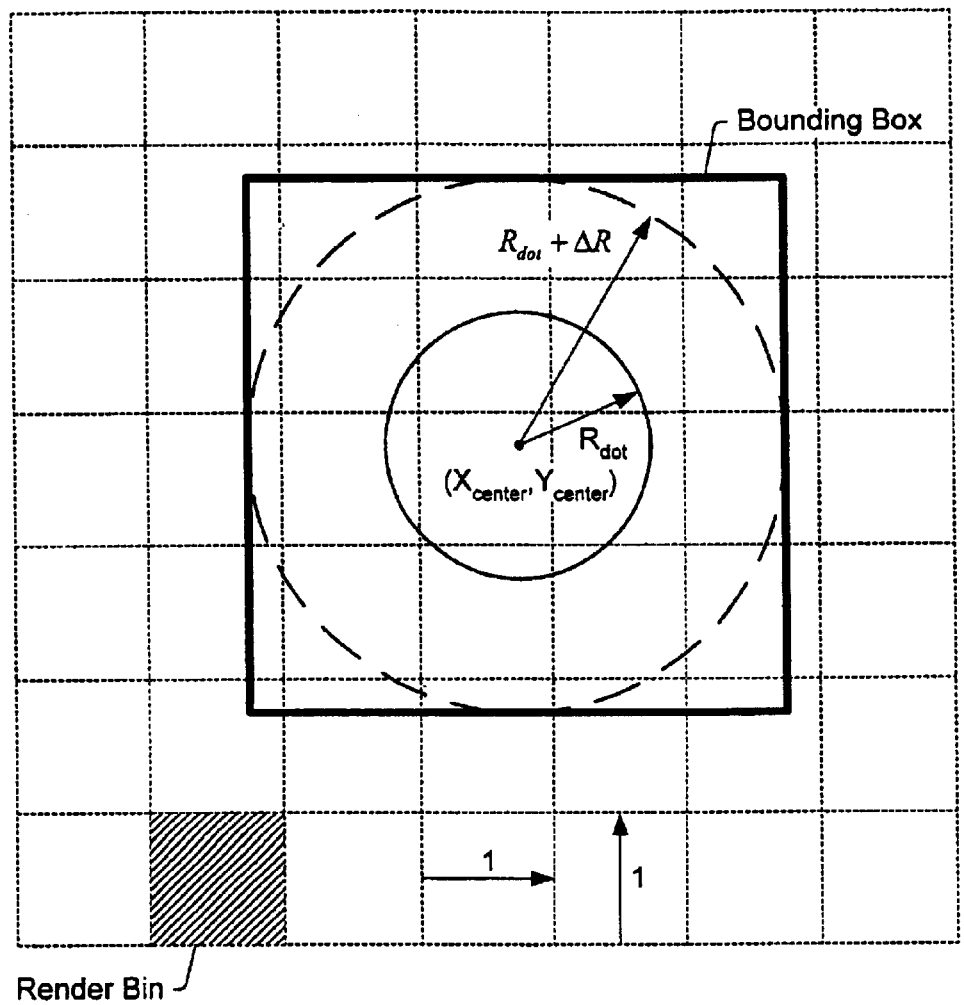
FIG. 7 illustrates one embodiment of dot rasterization computation.

In response to receiving the dot-defining parameters, hardware accelerator 18 may compute the boundary coordinates for a bounding box as suggested by FIG. 7. The bounding box may be a square which minimally contains the disk of radius $R_{dot}+\Delta R$ centered at the dot center position, where $R_{dot}=D_{dot}/2$. (The parameter $\Delta R$ may take any value in a wide range. In one set of embodiments, the parameter $\Delta R$ equals 1.5.) Thus, hardware accelerator 18 may compute the boundary coordinates for the bounding box by adding and subtracting the dot radius $R_{dot}$ from each of the center coordinates $X_{center}$ and $Y_{center}$:

$X_{left}=X_{center}-R_{dot}$ $X_{right}=X_{center}+R_{dot}$ $Y_{top}=Y_{center}-R_{dot}$ $Y_{bottom}=Y_{center}+R_{dot}$.

The bounding box serves to limit the spatial extent over which rendering computations associated with the dot are to be performed.

FIG. 7 illustrates a portion of a rendering coordinate space. The rendering coordinate space is tessellated with an array of render bins. It is convenient to model each render bin as a square region with side length one in the rendering coordinate space. However, in other embodiments, the rendering coordinate space may be tessellated with render bins having other shapes and/or sizes.

Figure 8:
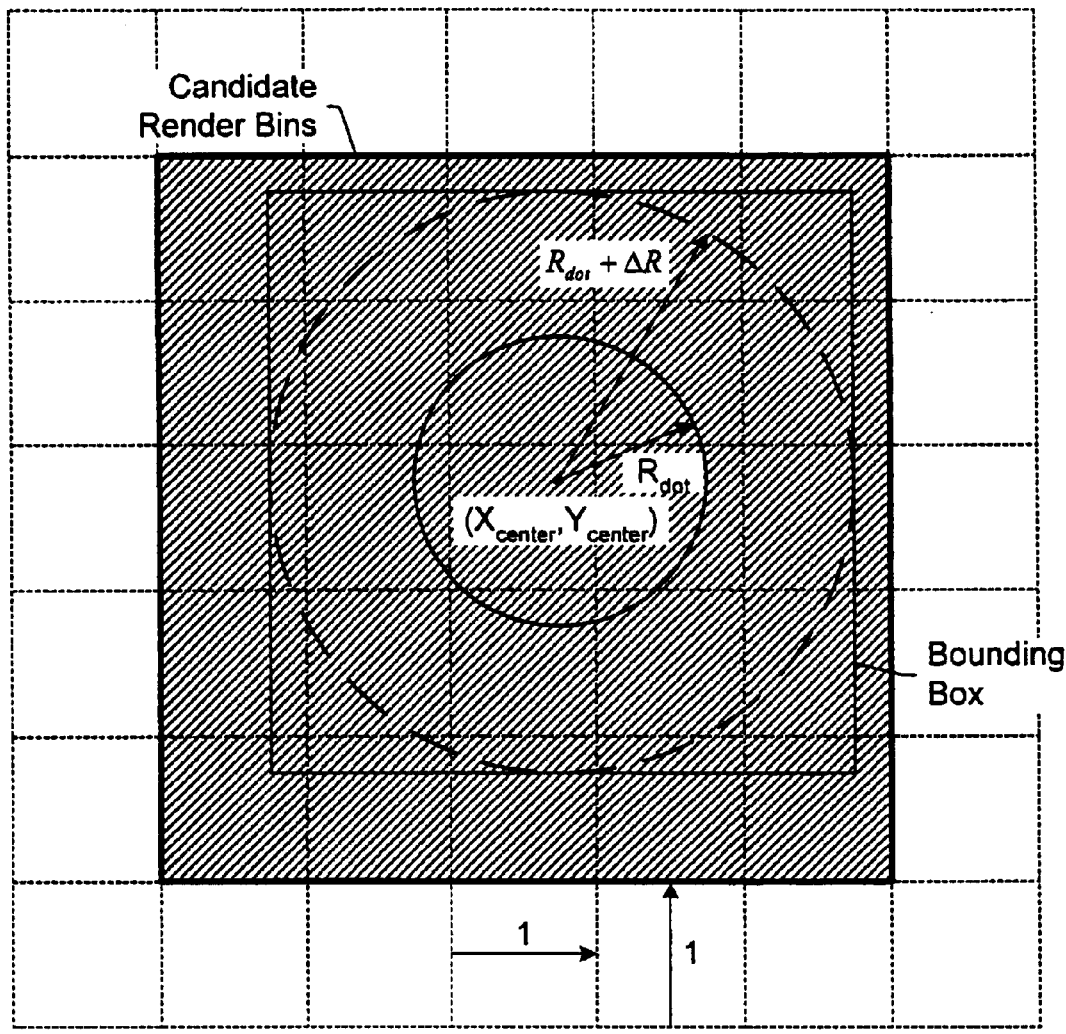
FIG. 8 illustrates a set of candidate bins which intersect a bounding box according to one embodiment.

FIG. 8 illustrates a collection of render bins which intersect with the bounding box. These intersecting render bins are referred to herein as candidate render bins. Hardware accelerator 18 may perform a set of rendering computations on each of the candidate render bins as described below.

Figure 9:
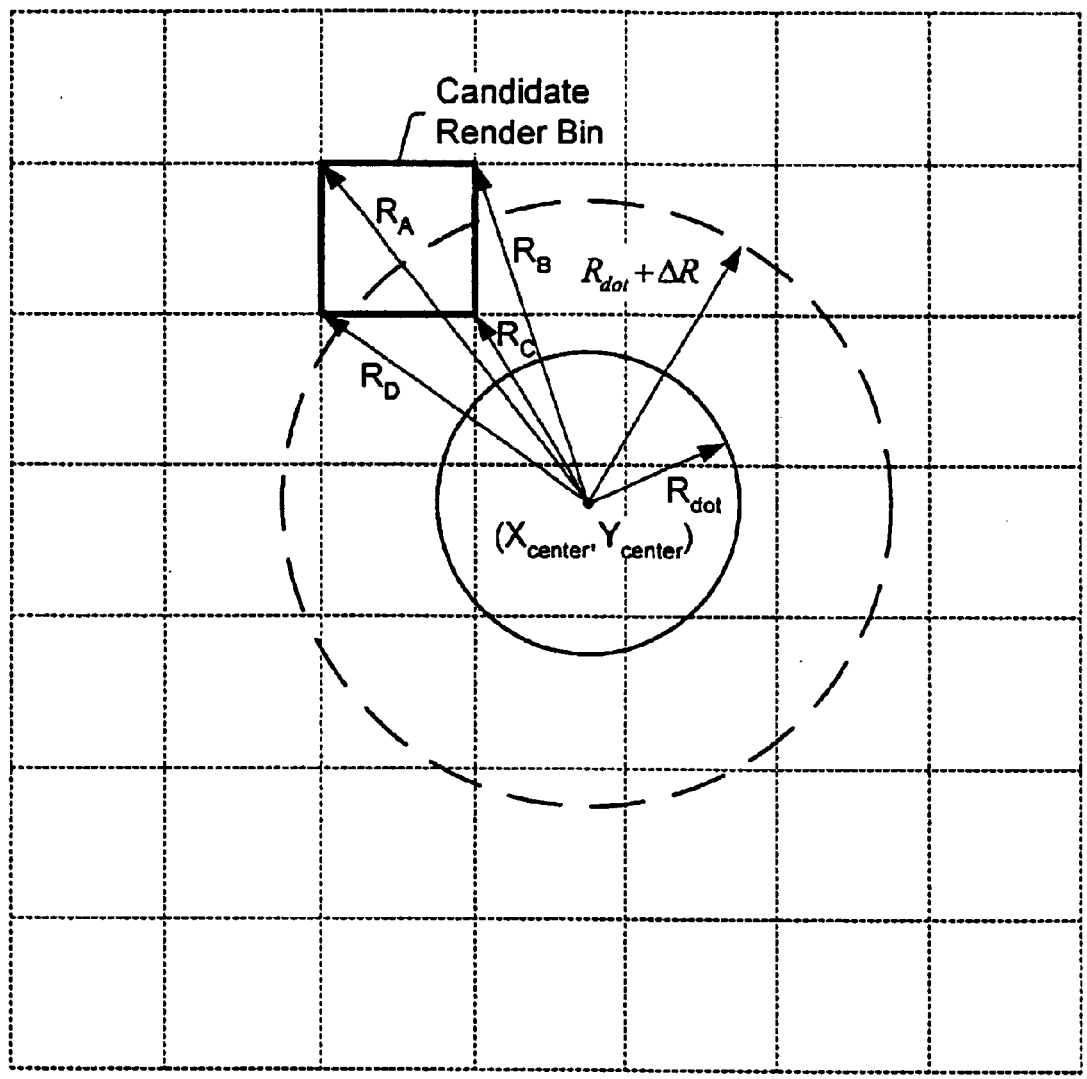
FIG. 9 illustrates the computation of radial distances of corners of a candidate render bin with respect to the dot center according to one embodiment.

For a given candidate render bin, hardware accelerator 18 may compute the radial distance of the corners of the candidate render bin with respect to the dot center position as suggested by FIG. 9. These corner radii $R_A$, $R_B$, $R_C$ and $R_D$ may be stored in a radial distance table.

Figure 10:
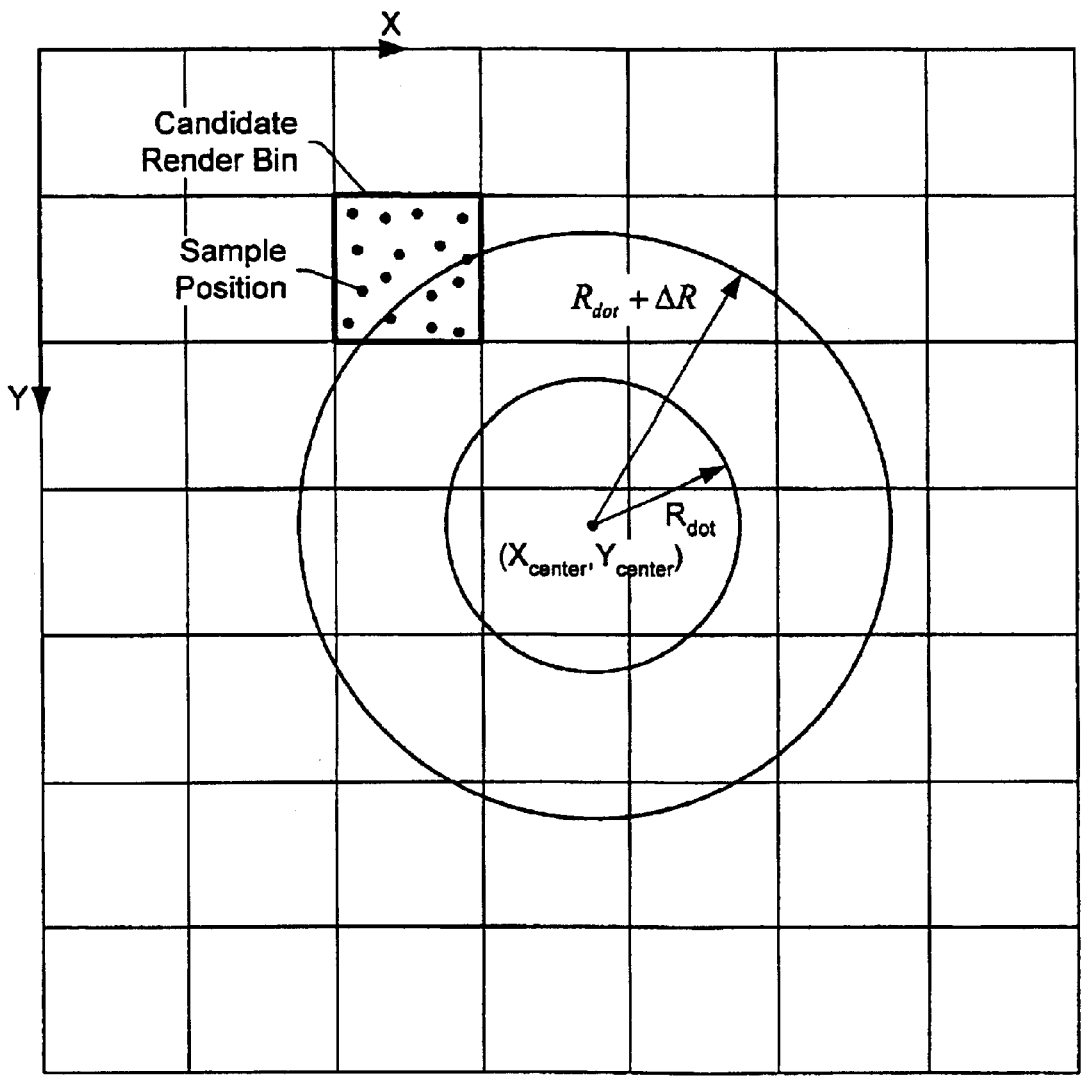
FIG. 10 illustrates one embodiment for the pseudo-random positioning of samples in a candidate render bin.

Hardware accelerator 18 may generate $N_{s/p}$ sample positions within the render bin as suggested by FIG. 10. The number $N_{s/p}$ of sample per render bin may be a programmable parameter. Each sample position S may be defined by a horizontal displacement value $\Delta X$ and a vertical displacement value $\Delta Y$ from an origin of the render bin (e.g. the top-left corner of the render bin). Hardware accelerator 18 may read the horizontal displacement and vertical displacement for each sample from a sample displacement table. The sample displacement table and/or the mechanism for accessing the table may be configured so that the sample positions have a random appearance. Alternatively, the sample displacement table and the mechanism for accessing the table may be configured so that the sample positions have a regular structure, e.g. a rectangular grid structure. The randomness or regularity of the sample positioning scheme may be a programmable attribute.

Hardware accelerator 18 generates an estimate for the radial distance of each sample in the candidate render bin (from the dot center position) based on a spatial interpolation of the corner radii $R_A$, $R_B$, $R_C$ and $R_D$. In one embodiment, hardware accelerator 18 may compute a radius estimate $R_s$ for a sample S according to the relation $R_S=(dR/dx)\Delta X+(dR/dy)\Delta Y$, where (dR/dX) is the rate of change of radius (i.e. distance from dot center) with respect to horizontal sample position, and (dR/dY) is the rate of change of radius with respect to vertical sample position. The rates (dR/dX) and (dR/dY) may be computed once for the render bin, and used to compute the sample radius estimates for all the sample positions interior to the render bin. Hardware accelerator 18 may read the corner radii from the radial distance table and perform arithmetic computations to determine the rates (dR/dX) and (dR/dY).

The difference in radius ($R_B-R_A$) along the top of the render bin, or the difference in radius ($R_C-R_D$) along the bottom of the render bin, or some combination (e.g. an average) thereof, may be used as the horizontal rate (dR/dX). Similarly, the difference in radius ($R_C-R_B$) along the right side of the render bin, or the difference in radius ($R_D-R_A$) along the left side of the render bin, or some combination thereof, may be used as the vertical rate (dR/dY). In embodiments where the render bin has a height and/or a width other than one, the radius differences may be divided by (or multiplied by the reciprocal of) the corresponding render bin dimension, e.g., (dR/dX)=($R_B-R_A$)/(RenderBin Width). These divisions may be implemented by shift operations when the render bin height and width are powers of two.

Figure 11:
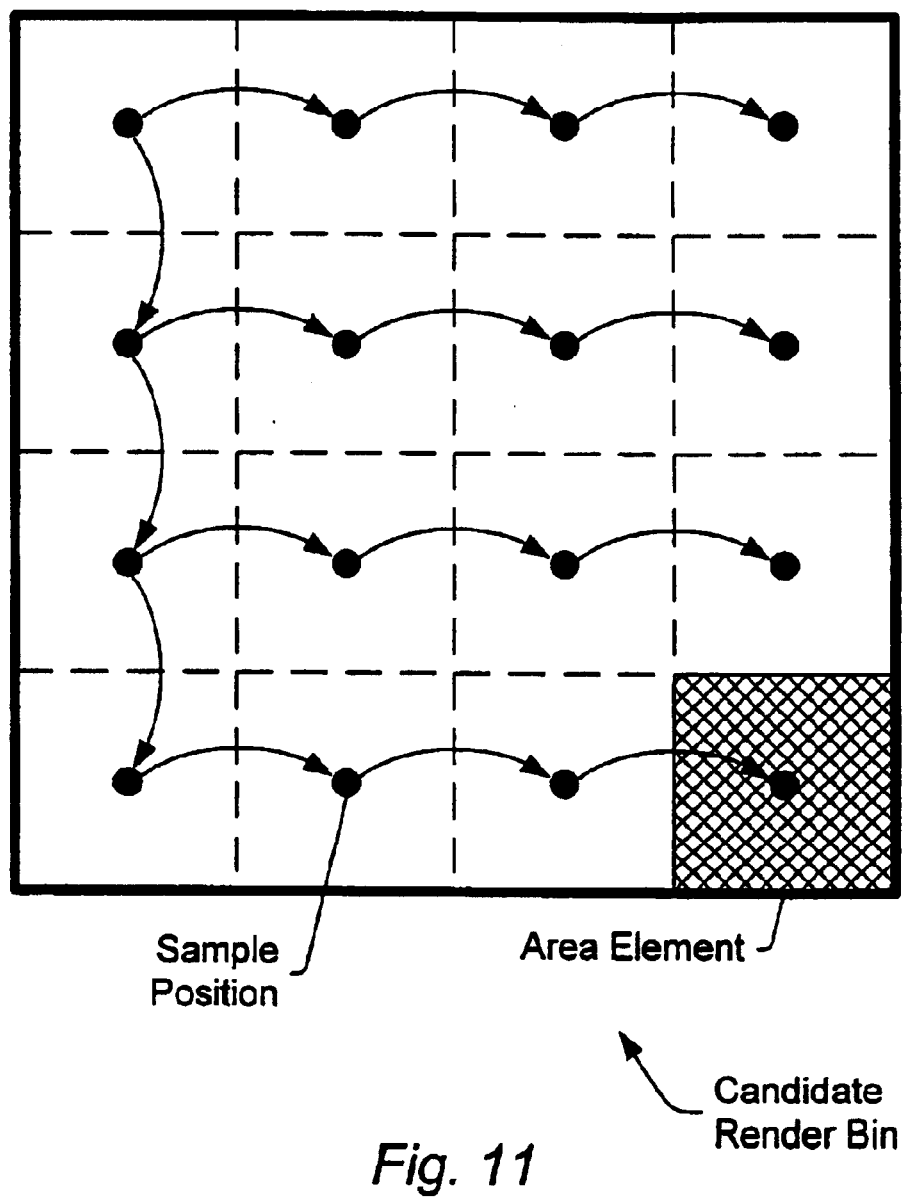
FIG. 11 illustrate one embodiment of a row walk algorithm for computing sample radius estimates by repeated addition based on a horizontal radius increment and a vertical radius increment.

In one set of embodiments, hardware accelerator 18 may organize the computation of sample radius estimates according to a "row walking" algorithm as suggested by FIG. 11.

Sample positions may reside on a regular rectangular grid within the candidate render bin. The grid may be interpreted as having multiple rows. For example, the grid of FIG. 11 has four rows of sample positions. Let $R_{I,J}$ denote the radius estimate for the $I^{th}$ sample position in the $J^{th}$ row of the render bin. Given the radius estimate $R_{0,0}$ for the first sample position in the first row, the radius estimate for succeeding sample positions in the first row may be determined by the recursive relation $R_{I+1,0}=R_{I,0}+H_R$. In other words, the next radius estimate for the next sample position in a row may be computed by adding a horizontal radius increment to the radius estimate of the current sample position. After the $J^{th}$ row of radius estimates has been computed, the first radius estimate $R_{0,J+1}$ of the $(J+1)^{st}$ row may be computed according to the relation $R_{0,J+1}=R_{0,J}+V_R$. In other words, the first radius estimate of the next row may be computed by adding a vertical radius increment to the first radius increment of the current row. Thus, the radius estimates for the entire array of sample positions may be generated from the radius estimate $R_{0,0}$ by repeated addition.

The horizontal radius increment $H_R$ and the vertical radius increment $V_R$ may be computed once per render bin based on the corner radius values $R_A$, $R_B$, $R_C$ and $R_D$. For example, if there are N samples in each row of samples, the horizontal increment may be computed according to the relation $H_R=(1/N)(R_B-R_A)$. It is noted the selection of the radius difference along the top edge of the render bin is arbitrary, and the radius difference along the bottom edge, or some average of the top and bottom edge differences, may be used as well. The multiplication by (1/N) is easily implemented by a shift if N is a power of 2. Similarly, if there are M samples in column of samples, the vertical increment may be computed according to the relation $V_R=(1/M)(R_D-R_A)$. It is noted that the selection of the radius difference along the left edge of the render bin is arbitrary, and the radius difference along the right edge, or some average of the left and right edge differences, may be used as well. In the embodiment of FIG. 11, the radius estimate $R_{0,0}$ may be computed according to the relation $R_{0,0}=(H_R/2)+(V_R/2)+R_A$.

Figure 12:
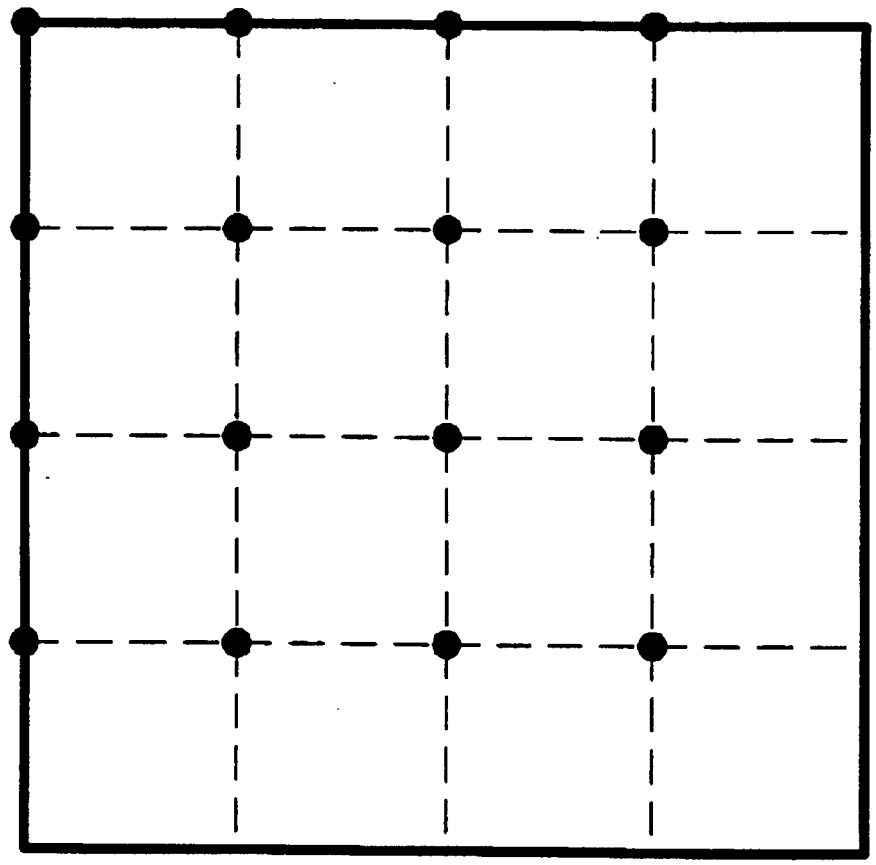
FIG. 12 illustrates another embodiment for the arrangement of sample positions within a candidate render bin.

FIG. 12 illustrates another possible configuration for sample positions within the render bin. Supposing the render bin is tessellated by an array of rectangles, the samples positions may occupy the top-left corners of the rectangles. In this configuration, the first sample of the first row coincides with the top-left corner of the render bin, and thus, $R_{0,0}$ equals $R_A$.

Any of a variety of configurations are contemplated for the sample positions, and the examples given in FIGS. 11 and 12 are not intended to be limiting.

Figure 13:
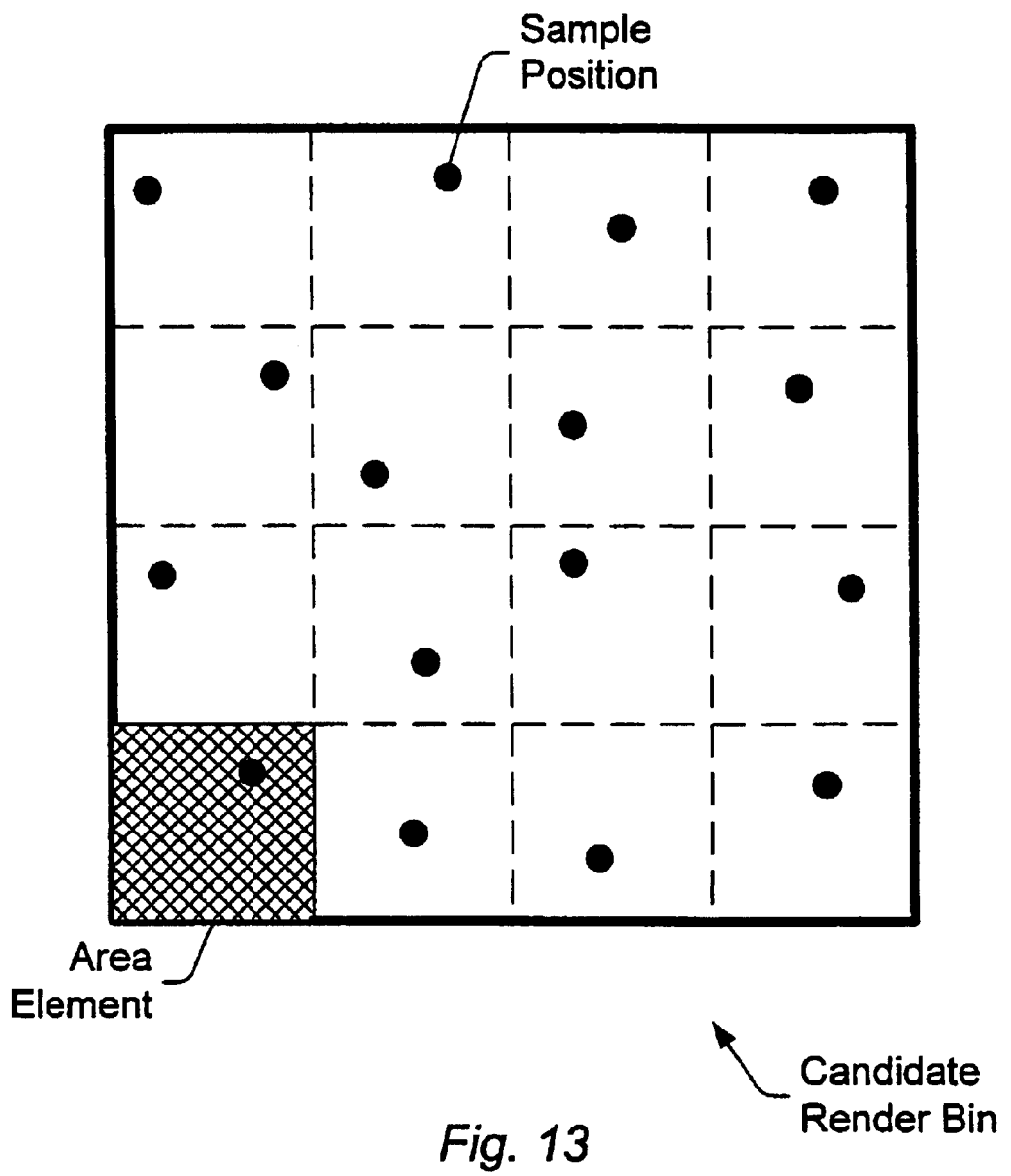
FIG. 13 illustrate a pseudo-random arrangement of sample positions within the candidate render bin.

In one set of embodiments, hardware accelerator 18 may generate a pseudo-random configuration of sample positions in the render bin as suggested by FIG. 13. For example, the render bin may be partitioned by an array of area elements with one sample position located in each area element. Because each sample position is close to its corresponding area element origin, hardware accelerator 18 may generate sample radius estimates for the pseudo-random configuration of sample positions by (a) computing radius estimates for the regular array of area element origins using the row walk algorithm described above, and (b) assigning the radius estimate for each area element origin to the corresponding sample position.

As suggested by FIG. 7, a dot may be interpreted as having an inner core disk of radius $R_{dot}$ centered on the dot center position. Samples falling in the inner core disk may be assigned a transparency value of one (corresponding to total opacity). The dot also includes a transitional annulus with inner radius equal to the dot radius $R_{dot}$ and an outer radius $R_2=R_{dot}+\Delta R$. Any sample falling in the transitional annulus is assigned a transparency value which depends on the radial difference $U_S=R_S-R_{dot}$, i.e. the difference between the sample's radius estimate and the dot radius. In particular, the sample transparency is determined based on a function $f(U_S)$ of the radial difference $U_S$ which continuously transitions from one at $U_S=0$ to zero at $U_S=\Delta R$. In other words, the transparency value of samples continuously varies from one at the inner radius of the transitional annulus to zero at the outer radius of the transitional annulus. In some embodiments, the transition function $f(U_S)$ is not only continuous but smooth. For example, function f may be a Gaussian function, a raised cosine, a polynomial function, etc.

Any samples of a candidate render bin with a radial distance estimate $R_S$ larger than the outer radius $R_2$ of the transitional annulus may be assigned a transparency value of zero. A transparency value of zero corresponds to total transparency (i.e. invisibility).

Hardware accelerator 18 may generate a transparency value for each sample in the candidate bin as outlined above. Namely, hardware accelerator 18 may compute the radial difference $U_S=R_S-R_{dot}$ for each sample in the candidate bin, and may compare the radial difference to zero and $\Delta R$. If the radial difference for a sample is less than or equal to zero, the sample's transparency value may be set to one. If the radial difference is greater than or equal to $\Delta R$, the sample's transparency value may be set to zero. If the radial difference is greater than zero and less than $\Delta R$, the sample's transparency value may be determined by table lookup in a transparency transition table which stores a set of values of the transition function $f(U_S)$. Alternatively, hardware accelerator may include dedicated circuitry for evaluating the transition function $f(U_S)$ based on computation of an algebraic expression (e.g. with a set of multipliers, adders, registers, etc.).

In one set of embodiments, frame buffer 22 may be configured to perform transparency blending. In other words, samples received by frame buffer 22 may be blended with corresponding samples already stored in frame buffer 22 based on the transparency values of the received samples. In this set of embodiments, hardware accelerator 22 may assign the dot color vector to all the samples in the candidate render bin. When the samples are transmitted to frame buffer 22, the desired transition of color from the dot color at the inner core to the ambient sample colors at the outer edge of the transitional annulus is achieved by the transparency blending action of the frame buffer 22.

In other embodiments, frame buffer 22 may not be configured to perform transparency blending. Thus, hardware accelerator 18 may perform the transparency blending operation. This involves reading samples from frame buffer 22, mixing them with corresponding samples generated by the dot rasterization based on the computed transparency values, and writing the resulting samples back to frame buffer 22.

Hardware accelerator 18 may process the candidate bins sequentially in a raster fashion, i.e. with the horizontal bin index moving faster than the vertical bin index. In some embodiments, hardware accelerator 18 may have parallel processing paths that allow two or more candidate render bins to be processed concurrently.

In one collection of embodiments, hardware accelerator 18 may be configured to compute squared radius (with respect to the dot center) at the corners of candidate render bins instead of radius. This avoids the computation of a square root for each of the corners. Likewise, estimates of square radius may be interpolated for each sample position in a candidate render bin based on the square radii at the corners of the render bin. The transition function f may be parameterized by the difference of squares $Q_S=(R_S)^2-(R_{dot})^2$ instead of the radius difference $U_S$, where $(R_S)^2$ denotes the estimated squared radius for a sample.

In general, hardware accelerator 18 may be configured to compute a radial extent value for each of the corners of a candidate render bin with respect to the dot center. The radial extent value may be Euclidean distance, squared Euclidean distance, distance computed with respect to some other vector norm or some function (e.g. a positive power) of such an alternative distance. Likewise, estimates of the radial extent value may be interpolated for each sample position in a candidate render bin based on the radial extent values at the corners of the render bin. The transition function f may be parameterized according to radial extent value.

Three Corners

It is noted that it is not strictly necessary to compute corner radii (or distance measures) at all four corners of a candidate render bin in order to perform linear interpolation of the radius (or distance measure) to sample positions inside the candidate render bin. In some embodiments, hardware accelerator 18 may compute radii (or distance measures) at only three corners of the candidate render bin and perform linear interpolation of radius (or distance measure) based on three corner radii.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for generating a dot on a display device, the method comprising:

receiving a graphics command specifying a dot center for the dot;

determining a set of candidate render bins which intersect a neighborhood of the dot center;

computing first radial extent values for corners of one of the candidate render bins with respect to the dot center;

interpolating estimated radial extent values for sample positions in said one candidate render bin with respect to the dot center based on the first radial extent values of said corners of said one candidate render bin;

computing sample values for samples associated with said sample positions, wherein said sample values depend on the estimated radial extent values of the sample positions; and generating pixels based on said sample values, and transmitting the pixels to the display device, wherein the pixels are useable to present the dot on the display device.

2. The method of claim 1, wherein said computing sample values for samples associated with the sample positions comprises:

assigning a transparency value for each of said samples depending on the estimated radial extent value of the corresponding sample position; and computing one or more color values for each of said samples based on said transparency value of said sample.

3. The method of claim 2, wherein said assigning said transparency value for each of said samples comprises:

comparing the estimated radial extent value of the corresponding sample position to a lower limit value; and setting the transparency value equal to a first value which corresponds to total opacity if the estimated radial extent value is smaller than the lower limit value.

4. The method of claim 2, wherein said assigning a transparency value for each of said samples comprises:

comparing the estimated radial extent value of the corresponding sample position to an upper limit value; and setting the transparency value equal to a second value which corresponds to total transparency if the estimated radial extent value is greater than the upper limit value.

5. The method of claim 2, wherein said assigning a transparency value for each of said samples comprises:

computing a radial extent difference between the estimated radial extent value of the corresponding sample position and a dot radial extent value associated with the dot;

accessing a transparency transition table using said radial extent difference to determine the transparency value in response to the radial extent difference being greater than a lower limit and smaller than an upper limit.

6. The method of claim 5, wherein the graphics command further specifies a dot extent parameter, wherein the dot extent parameter determines the dot radial extent value and the lower limit value.

7. The method of claim 1, wherein said computing the first radial extent values comprises computing the radius of said corners of said one candidate render bin with respect to the dot center.

8. The method of claim 1, wherein said computing the first radial extent values comprises computing the square radius of said corners of said one candidate render bin with respect to the dot center.

9. The method of claim 1, wherein the graphics command further specifies one or more dot color values for the dot, wherein said computing sample values for samples associated with said sample positions in said one candidate render bin comprises:

assigning the one or more dot colors to the samples associated with said sample positions;

assigning transparency values to the samples based on the estimated radial extent values of said associated sample positions;

blending the samples with previous stored samples corresponding to said sample positions using the transparency values of the samples.

10. The method of claim 1, wherein the neighborhood of the dot center comprises a bounding box which contains a circular disk centered on the dot center and having a first radius equal to a second radius of the dot plus a transition thickness.

11. A graphics system configured to generate a dot on a display device, the graphics system comprising:

a rendering unit configured to (a) receive a graphics command specifing a dot center for the dot, (b) compute first radial extent values indicating radial extent from the dot center to a plurality of first positions in a neighborhood of the dot center, (c) interpolating estimated radial extent values at sample positions in the neighborhood based on the first radial extent values, (d) computing sample values for samples corresponding to said sample positions, wherein said sample values depend on the estimated radial extent values of the sample positions;

a pixel computation unit configured to operate on the sample values to generate output pixels for transmission to a display device, wherein the output pixels are useable to present the dot on the display device.

12. The graphics system of claim 11, wherein said rendering unit is further configured to perform (d) by applying a continuous transition of color values for said samples based on a function of the estimated radial extent values of the corresponding sample positions.

13. The graphics system of claim 12, wherein said rendering unit is further configured to apply the continuous transition of color values for said samples by accessing a radial transition table storing values of said function based on the estimated radial extent values.

14. The graphics system of claim 11, wherein said rendering unit is configured perform (d) by computing transparency values for said samples based on said estimated radial extent values, assigning a dot color vector associated with the dot to the samples and transmitting the transparency values and dot color vectors for the samples to a frame buffer, wherein the frame buffer is configured to perform transparency blending of the samples with previous samples already stored in the frame buffer based on the transparency values.

15. The graphics system of claim 14, wherein the neighborhood of the dot center comprises a bounding box which contains a circular disk centered on the dot center and having first radius equal to a second radius of the dot plus a transition thickness.

16. The graphics system of claim 11, wherein the rendering unit is configured to perform (d) by assigning a first transparency value corresponding to total opacity to samples with estimated radial extent values smaller than a lower limit and assigning a second transparency value corresponding to total transparency to samples with estimated radial extent values larger than an upper limit.

17. The graphics system of claim 16, wherein the graphics command further specifies a dot extent parameter, wherein the lower limit is determined by the dot extent parameter.

18. The graphics system of claim 11, wherein the pixel computation unit is configured to filter said sample values to generate said output pixels.

19. The graphics system of claim 11, wherein the pixel computation unit and the rendering unit are configured within a single integrated circuit.

20. A memory medium configured to store program instructions, wherein the program instructions are executable by a processor to implement:

receiving a graphics command specifying a dot center for a dot;

computing first radial extent values correspondipg to corners of a bin near a center of the dot, wherein the first radial extent values indicate radial extent of said corners with respect to the dot center;

interpolating estimated radial extent values for sample positions in said bin with respect to the dot center based on the first radial extent values of the corners of said bin;

computing sample values for samples at said sample positions, wherein said sample values depend on the estimated radial extent values of the sample positions; and filtering the sample values to generate output pixels for transmission to an output device, wherein the output pixels are useable to display the dot.

21. The memory medium of claim 20, wherein said computing sample values for samples at the sample positions comprises:

assigning a transparency value for each of said samples depending on the estimated radial extent value of the corresponding sample position; and computing one or more color values for each of said samples using said transparency value of said sample.

22. The memory medium of claim 21, wherein said assigning said transparency value for each of said samples comprises:

comparing the estimated radial extent value of the corresponding sample position to a lower limit value; and setting the transparency value equal to a first value which corresponds to total opacity if the estimated radial extent value is smaller than the lower limit value.

23. The memory medium of claim 21, wherein said assigning a transparency value for each of said samples comprises:

comparing the estimated radial extent value of the corresponding sample position to an upper limit value; and setting the transparency value equal to a second value which corresponds to total transparency if the estimated radial extent value is greater than the upper limit value.

24. The memory medium of claim 24, wherein said assigning a transparency value for each of said samples comprises:

computing a radial extent difference between the estimated radial extent value of the corresponding sample position and a dot radial extent value associated with the dot;

accessing a transparency transition table using said radial extent difference to determine the transparency value in response to the radial extent difference being greater than a lower limit and smaller than an upper limit.

* * * * *

UNITED STATES PATENT AND TRADEMARK OFFICE
CERTIFICATE OF CORRECTION

PATENT NO. : 6,731,300 B2
DATED : May 4, 2004
INVENTOR(S) : Ramani et al.

It is certified that error appears in the above-identified patent and that said Letters Patent is hereby corrected as shown below:

Column 14,
Line 54, please delete "cireular" and substitute -- circular --.

Column 15,
Line 53, please delete "correspondipg" and substitute -- corresponding --.

Signed and Sealed this

Tenth Day of August, 2004

JON W. DUDAS
*Acting Director of the United States Patent and Trademark Office*